INVENTORS
HARRY E. FRANKS
and
ARNOLD J. ARONSON
BY
Wilfred J. Baranick
Charles S. McGuire
ATTORNEYS

United States Patent Office 3,416,031
Patented Dec. 10, 1968

3,416,031
FLASH LAMP OPERATING MEANS
Harry E. Franks, Newton, and Arnold J. Aronson, Brookline, Mass., assignors to Maser Optics, Inc., Boston, Mass., a corporation of Massachusetts
Filed Apr. 16, 1965, Ser. No. 448,589
17 Claims. (Cl. 315—119)

ABSTRACT OF THE DISCLOSURE

An AC power supply for a laser pumping lamp passes current through the lamp only when the supply voltage for the lamp is above the lasing threshold voltage and maintains the lamp in the off condition when the supply voltage is below this level. This prolongs the life of the lamp by confining its operation to those intervals in which a useful light output is obtained.

---

This invention relates to electrical power supply means suitable for operating an arc-gap flash tube of the type suitable for pumping optical lasers, and the like.

Flash tubes of the type described conventionally take the form of a quartz tube containing an inert gas (e.g. xenon) at low pressure, with electrodes sealed into the opposite ends. One or more of such tubes may be positioned within a cavity having a highly reflective internal surface with a laser rod arranged to receive the light energy output of the flash lamp. The term "laser rod" as used herein is intended to apply to any medium capable of emitting an amplified beam of monochromatic light upon proper excitation. One example of such a medium, used as an example in the following discussion, is aluminum oxide in crystalline form doped with a small amount of chromium, which is hereinafter referred to as a ruby rod. It will be understood, however that a wide variety of materials in many different forms are presently known and used for such purposes, and the present invention may be practised in combination with any of these. Furthermore, the use of the flash lamp powered in accordance with the present invention to provide the pumping energy for a laser rod is offered only by way of example as a most useful method of practising the invention.

Flash lamps of the type under consideration herein are normally powered by energy storage capacitor means, charged by an appropriate power supply and shunting the electrodes of the tube. The normal resistance between the tube electrodes is too high to permit discharge of the capacitor means until the resistance is lowered by ionizing the gas in the tube, for example. The conventional approach to effecting ionization of the gas, or "triggering" of the tube, has involved the use of a helical conductor wrapped around the tube such that the conductor encircles the outside of the tube envelope and is capacitively coupled to the gas inside. The application to the conductor of a relatively large amplitude voltage pulse causes the gas to ionize sufficiently to effect discharge of the storage capacitor through the tube, producing a short burst of intense light containing sufficient energy at the pumping frequency of the laser rod to cause a population inversion to occur.

Capacitor means having an energy storage capacity sufficient to power the usual arc-gap flash lamps normally comprise a capacitor bank which is very expensive, as well as large and heavy, with obvious disadvantages. Accordingly, it is a principal object of the present invention to provide electrical power supply means for an arc-gap flash tube which are relatively simple and economical in construction and, at the same time, extremely light and compact as compared with the conventional capacitor bank power supplies.

A further object is to provide a high energy pulse discharge means for powering an arc-gap flash lamp in combination with means for properly synchronizing the aforementioned pulse with a triggering pulse adapted to ionize the gas in the flash tube, thereby lowering the resistance between the electrodes sufficiently to allow arcing from the high energy pulse.

A still further object is to provide power supply means for a flash lamp which supplies energy to a laser rod wherein discharge tube means are arranged to supply the high energy electrical pulse for powering the flash lamp.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1:
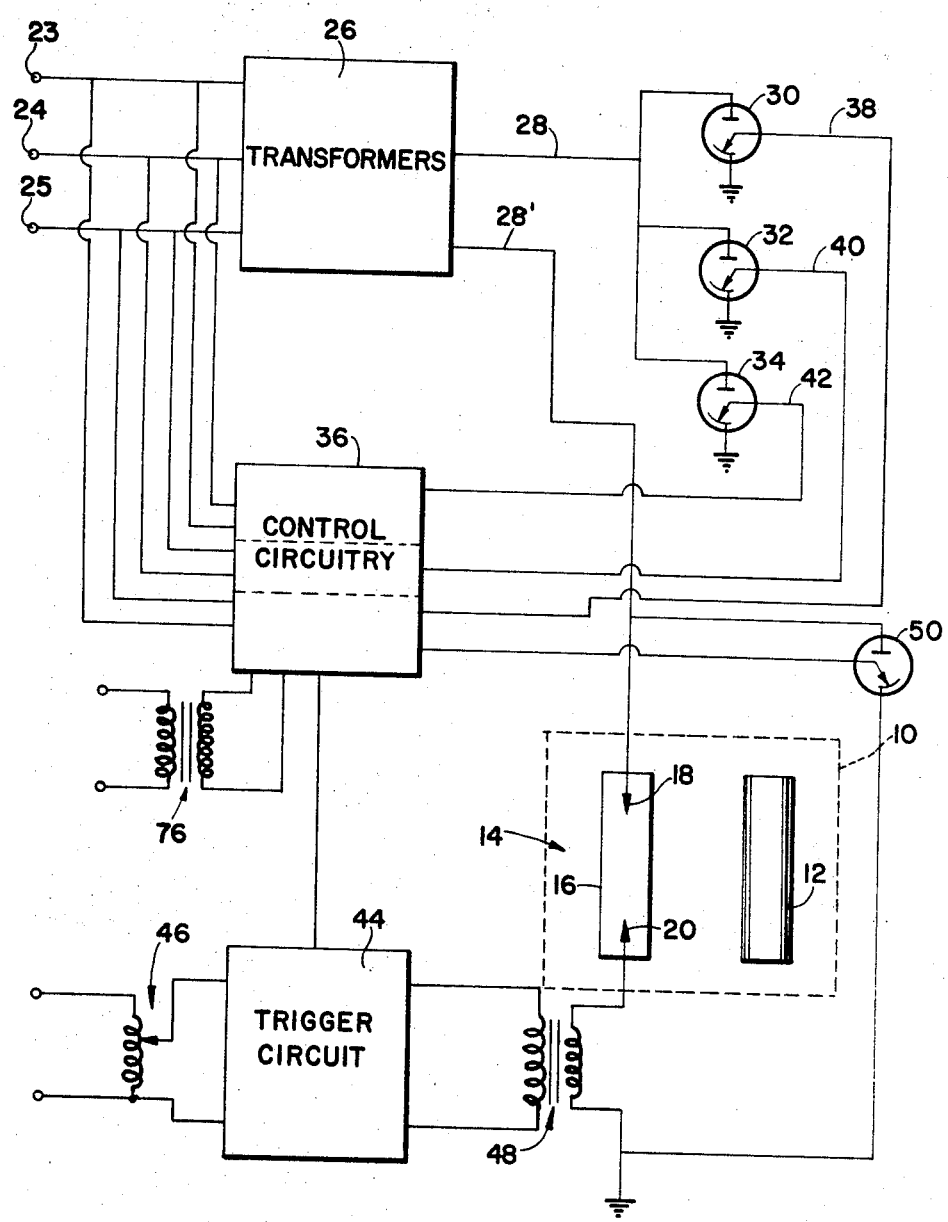
FIGURE 1 is a schematic circuit diagram showing one embodiment of a suitable arrangement for operating a flash lamp according to the present invention.

Referring now to the drawings, the reference numeral 10 denotes an optical laser oscillator head which may comprise, for example, a standard elliptical cavity having a highly reflective internal surface. Mounted within laser head 10 at one focus of the elliptical reflector system, is a laser rod such as ruby crystal 12, and at the other focus an arc-gap flash tube 14. As is well known, the axial ends of the laser rod are polished optically flat and parallel, one end being provided with a totally reflecting coating and the other end being provided with a partially reflecting coating. When the intensity of the light flash produced by tube 14 exceeds a certain critical value, a population inversion of the impurity atoms in the crystal occurs and an intense monochromatic beam of coherent light is emitted from the partially reflecting end of the rod.

Flash tube 14 is capable of producing light of sufficient intensity to pump laser rod 12 above its lasing threshold and usually takes the form of a tubular quartz envelope 16 containing xenon gas at a low pressure and having metallic electrodes 18 and 20 sealed therein at opposite axial ends. In the usual practice, electrodes 18 and 20 are shunted by a bank of capacitors connected in parallel and adapted to supply a high voltage pulse to the lamp for a period of 1–15 milliseconds, thus producing the light output required from lamp 14. As may be seen from FIGURE 1, however, the present invention employs discharge tube means connected to electrode 18 via lines 28 and 28' and transformers 26, electrode 20 being connected to ground. The discharge tube preferably comprises one or more coaxial ignitron tubes which are capable of supplying a pulse with the high current flow required to operate flash lamp 14 above the lasing threshold output of lamp 14.

In the embodiment of FIGURE 1, the power supply is arranged to operate from two phases of a three phase system having low impedance input lines 23, 24 and 25 carrying alternating current at, for example 220 volts, 60 cycle. Transformers indicated by block 26, are provided to step up the line voltage to a desired input level to the ignitrons, e.g. 500 volts. The output of the transformers 26 appears across the leads 28–28'. Because of the high current requirements (e.g. 3,000 amps or more) the transformer windings as well as the input lines themselves should have a very low impedance, which may be achieved by proper selection of previously known transformers and conductors.

Line 28 in the schematic circuit diagram indicates an input to ignitrons 30, 32 and 34 from transformers 26, it being understood that each of the ignitrons is arranged to operate from different phases of the line inputs through the transformer connections. Appropriate control circuitry, indicated generally by block 36, is provided to supply firing pulses of, for example, 200 volts peak, to the various ignitrons at the proper times. Firing pulse input line 38 to ignitron 30 is supplied through control circuitry connected across input lines 23 and 25 of the three phase system. Likewise, firing pulse input line 40 to ignitron 32 is connected across line 24 and 25, and firing pulse input line 42 to ignitron 34 is connected, through the aforementioned control circuitry, across lines 23 and 24. Each of the ignitrons, of course, are arranged to receive power from the same lines as those to which their respective firing pulse input lines are connected.

An appropriate trigger circuit, indicated by block 44, is provided to supply a high voltage pulse so that the gas in lamp 14 will be ionized, thus lowering the resistance between electrodes 18 and 20 to permit discharge of the ignitrons through the lamp. Trigger circuit 44 may be connected through an adjustable autotransformer 46 to a low voltage power supply, e.g. 115 volts AC. The trigger circuit may employ a conventional spark plug, acting as a switch, through which a capacitor is discharged at the desired triggering time to provide an output pulse of, e.g. 2 kv. This is stepped up by transformer 48 to provide an ionizing pulse of e.g. 16 kv. to anode 20. After ionization of the gas, flash lamp 14 will present a much lower impedance to the ignitron power supply, thus permitting the high current to be conducted therethrough.

Figure 2:
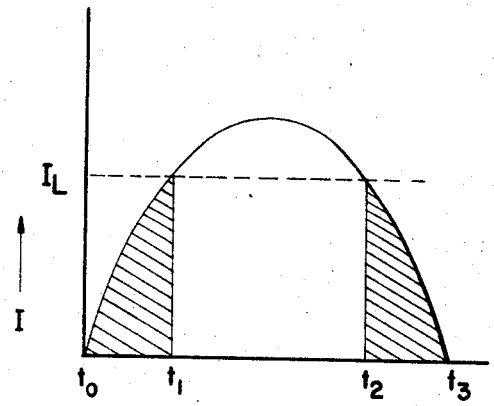
FIGURE 2 is a graphical illustration of current flow through the flash lamp with respect to time.

Referring now to FIG. 2, there is shown the relationship between current flow (I) through lamp 14 during discharge of one of the ignitrons, with respect to time (T). As previously mentioned, the light energy output from lamp 14 must reach a certain critical value before lasing of crystal 12 occurs. The energy output is, of course, directly related to current flow through the lamp. The point indicated as I will not produce lasing, thus, it may be seen that any power supplied to lamp 14 between the times indicated on the graph as $t_0$ and $t_1$, and between times $t_2$ and $t_3$, i.e. those portions under the curve which are shaded in FIG. 2, will not produce lasing. The life of the flash lamp and possible damage thereto, and therefore the overall economy of the system, are directly related to the total power discharged through the lamp. With this in mind, the system is designed to operate according to the present invention to allow current flow through lamp 14 substantially only between the times indicated on the graph of FIG. 2 as $t_1$ and $t_2$. This is accomplished through proper use of the control circuitry and associated elements as described more fully in the following paragraphs.

Control circuitry 36 is adapted to provide a firing pulse to ignitron 30 at time $t_1$ so that the current flow through the lamp will, for practical purposes, instantaneously reach the level required to produce lasing. Time $t_1$, is a function of the phase of the AC input to the ignitron and firing at time $t_1$ is achieved through the sampling by the control circuit of this input (across lines 23 and 25) thus providing a voltage in the control circuit which is scaled in both time and amplitude to the AC input to ignitron 30. The firing time may be controlled, for example, by providing in the control circuit a variable resistor which may be selectively set to control the charging rate of a capacitor, the voltage level of which serves to bias a unijunction transistor, or the like. The transistor, in turn, is triggered to supply a pulse through a transformer to the igniter of the ignitron. The control circuitry may also advantageously employ silicon controlled rectifiers in conventional fashion to accomplish the functions previously mentioned and those described hereinafter (see for example, SCR manual of General Electric Co.).

The control circuit also supplies a control pulse to trigger circuit 44 so that the ionizing pulse provided thereby is properly synchronized with the firing pulse to the ignitrons. That is, when the firing pulse is applied to the ignitron, the current flow must be sufficient to maintain an arc condition. The igniter to cathode arc will not transfer and become an anode-cathode arc unless the anode-cathode circuit is complete and the anode is positive. If the load (i.e., the lamp resistance) is too high, as is the case before ionization occurs, the current flow in the ignitron is insufficient to keep the arc alive. However, the lamp resistance is sufficiently reduced upon ionization of the gas to permit sufficient current flow for arcing of the ignitron.

Referring again to FIG. 2, the current flow from the ignitron through the lamp is cut off at time $t_2$. This is accomplished according to the embodiment of FIGURE 1, by providing an additional ignitron 50 which, upon firing thereof, short circuits the flash lamp. Again, the firing pulse to ignitron 50 is provided by control circuit 36 at the proper time with respect to the phase of the AC input to ignitron 30. Thus, the power output of the ignitron between times $t_2$ and $t_3$, which is insufficient to produce lasing, is diverted through ignitron 50 which prevents power dissipation through the lamp after the current value has dropped below the lasing threshold.

As will be understood from the previous consideration of FIG. 2, the current flow from the ignitron between times $t_0$ and $t_3$ represents one half cycle of the AC input to the ignitron. The control circuit is adapted to provide successive firing pulses to ignitrons 30, 32 and 34, through lines 38, 40 and 42, respectively, so that the ignitrons are fired in succession in proper synchronism with the AC input. In this manner, the discharge time at or above the lasing threshold may be increased to equal or exceed that which is obtained from the usual capacitor bank. It is also possible, of course, to use more than three ignitrons for powering the lamp, if desired, or to provide means for recycling the firing of the ignitrons in the illustrated embodiment to allow even longer discharge times.

The use of three ignitrons in the three phase system described above also makes possible the use of smoother wave forms for any given frequency. For example, if the three ignitrons were triggered at successive, positive half-cycles of each phase, the sequential firing would take place at 120° intervals since successive cycles are 120° apart. However, it is possible according to well known techniques to reverse the polarity of alternate half-cycles in each phase. That is, the polarity of the negative voltage portion of the cycles in each phase may be reversed so that, in effect, two positive peaks are provided in each complete cycle in each phase. Thus, the successive peaks will be only 60° apart, rather than 120°, and one of the ignitrons will be fired at each 60° interval. In this manner, variations in light output of the lamp above the lasing threshold may be decreased. Of course, a higher frequency AC power source may be used (i.e., above 60 cycles per second) to provide an even smoother wave form if desired.

Figure 3:
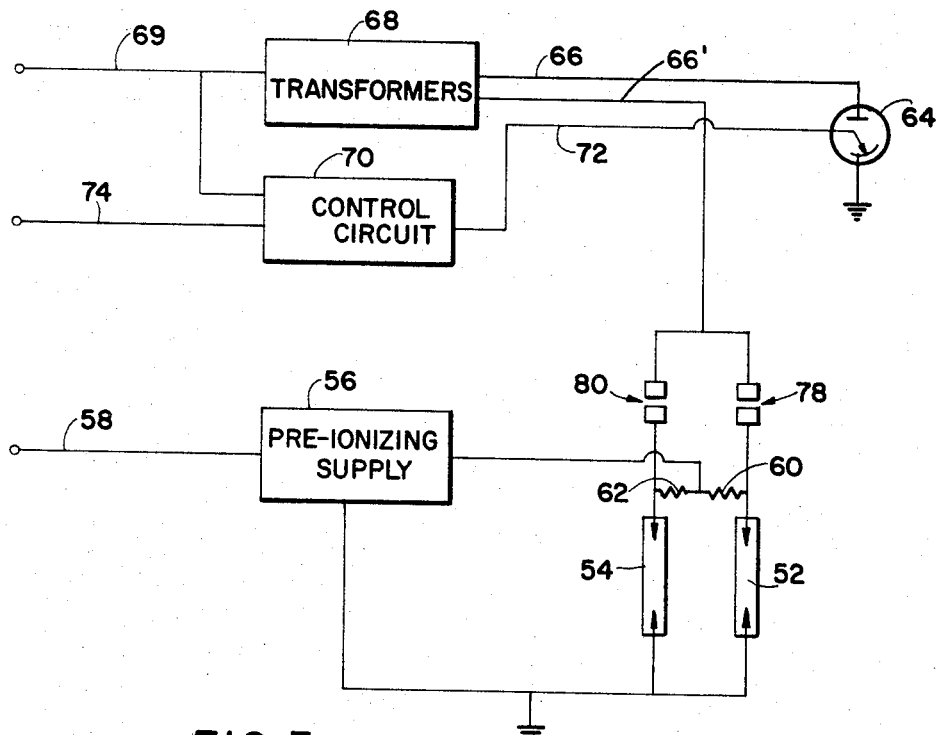
FIGURE 3 is a schematic circuit diagram showing another embodiment of the circuit arrangement.

The embodiment of FIG. 3 illustrates a number of variations which may be incorporated with some of the features of the FIGURE 1 embodiment, or vice versa. Two flash lamps 52 and 54 are electrically connected in parallel for simultaneous operation, and it will be understood that any number of lamps for which sufficient power is available may be so employed. It is sometimes desirable to maintain the lamps in an ionized state rather than supplying a trigger pulse to the anode, as in the FIGURE 1 embodiment, or to a trigger conductor wrapped on the tube, etc. A high voltage supply 56 is connected to provide a steady voltage sufficient to maintain ionization in lamps 52 and 54. The pre-ionizing supply is connected, by schematically illustrated line 58, to an appropriate AC source which may be stepped up by appropriate transformers as required. Although the particular voltage required to maintain ionization may vary from one lamp to another, the supply 56 is connected through resistors 60 and 62 to lamps 52 and 54, respectively, and the lamps will operate at their proper, respective, preionizing voltages.

Ignitron 64 is provided as in the previous embodiment for discharge through the lamps. Of course, more than one ignitron may be used if required. Power to ignitron 64 is carried by line 66 after passing through any necessary transformers 68 connected through line 69 to a preferably high voltage AC source. The output of transformers 68 appears across the lines 66–66'. Appropriate control circuitry, indicated generally by block 70, again samples the AC supply through line 69 and supplies a firing pulse through line 72 to the igniter of ignitron 64. Control circuit 70 may receive an operating voltage from a low voltage source through line 74; control circuitry 36 of the FIGURE 1 embodiment may likewise be connected to a low voltage power source, through transformer 76, if required. To prevent lamps 52 and 54 from shorting together, hold-off gaps 78 and 80 are provided. These may comprise, for example, a pair of carbon rods spaced a few thousandths of an inch apart. Diodes could also be used to serve this function, but those presently known and economically acceptable are not as suitable as the hold-off gaps due to the high currents being carried. The control circuit in the FIG. 3 embodiment provides a firing pulse to ignitron 64 at the proper time with respect to the phase of the AC input thereto, but no synchronizing pulse is required since the lamp does not have to be triggered to produce ionization.

It will be understood in connection with the foregoing explanation that all suggested values of various electrical parameters are merely representative and may be varied according to design considerations. Transformers may be eliminated where supply voltages are available at the proper level.

Since certain changes may be made in the above apparatus without departing from the scope of the invention herein involved it is intended that all matter contained in the foregoing description or shown in the accompanying drawings shall be interpreted as illustrative and not in a limiting sense.

What is claimed is:

1. Apparatus for operating a gas filled arc-gap flash lamp, comprising:
    (a) discharge tube means for supplying to said flash lamp, in response to a triggering signal, a high current electrical discharge;
    (b) means connecting said discharge tube means to said lamp;
    (c) means for supplying said triggering signal to said discharge tube means to produce discharge thereof at a predetermined time;
    (d) ionizing means connected to said lamp and operative to cause the gas in said lamp to ionize, thereby lowering the resistance between the terminals thereof sufficiently to allow discharge of said discharge tube means through said lamp; and
    (e) means insuring operation of said ionizing means at said predetermined time in synchronism with the operation of said discharge tube means.

2. The invention according to claim 1 wherein said discharge tube means is powered by an AC source and said means for supplying said triggering signal comprises a control circuit adapted to supply said signal as a function of the phase of said AC source.

3. The invention according to claim 2 which includes auxiliary discharge tube means connected in parallel with said lamp and operative in response to a signal from said triggering signal means to conduct during the firing of said lamp to thereby extinguish said lamp.

4. The invention according to claim 2 wherein said lamp is arranged in proximity to a laser rod and at least a portion of said high current discharge is of sufficient magnitude to produce a light output from said lamp above the lasing threshold of said rod.

5. The invention according to claim 2 wherein said discharge tube means comprises at least one coaxial ignitron tube.

6. The invention according to claim 3 wherein said AC source is supplied to said ignitron tube through low impedance conductors.

7. Apparatus for operating one or more gas filled, arc-gap flash lamps to produce a high energy light output therefrom, said apparatus comprising, in combination:
    (a) a source of AC electrical power;
    (b) a plurality of discharge tubes arranged to receive power from said source and each connected to said lamps for supplying thereto a high current electrical discharge in response to application of a firing pulse to said tubes;
    (c) a trigger circuit adapted to supply, in response to an input signal, an electrical pulse adapted to effect ionization of the gas in said lamps, thereby reducing the resistance thereof sufficiently to allow discharge of at least one of said discharge tubes through said lamps;
    (d) a control circuit arranged to receive an input from said AC source and to supply said firing pulse to said tubes as a function of the phase of said AC source; and
    (e) means for supplying said input signal to said trigger circuit from said control circuit in synchronism with supplying of said firing pulse to said tubes, whereby said electrical pulse provides ionization of said gas at the time of discharge of said tubes.

8. The invention according to claim 7 wherein said firing pulse is supplied to said tubes at such time with respect to the phase of the AC input to said tubes that the initial level of the current flow through said lamps is sufficient to raise the light output therefrom substantially instantaneously to a predetermined level.

9. The invention according to claim 8 and further including means adapted to short circuit said lamps, thereby absorbing said discharge from said discharge tubes, when said current flow falls below the level required to maintain said light output above said predetermined level.

10. The invention according to claim 9 wherein said AC source comprises a three phase system and said discharge tube means includes at least one tube connected across each of the three pairs of phases of the system.

11. Apparatus for operating one or more gas filled, arc-gap flash lamps to produce a high energy light output therefrom, said apparatus comprising, in combination:
    (a) a source of AC electrical power;
    (b) at least one electrical discharge tube arranged to receive power from said source and connected to said lamps for supplying thereto, in response to a firing pulse, a high current electrical discharge;
    (c) means for applying to said lamps a steady supply voltage sufficient to maintain ionization of the gas therein; and
    (d) means for applying said firing pulse to said discharge tube at a predetermined time with respect to the phase of said AC source.

12. The invention according to claim 10 wherein said electrical discharge is applied to at least two flash lamps connected in parallel circuit relationship.

13. The invention according to claim 10 wherein resistors are connected in series with each of said flash lamps and said supply voltage is applied to said lamps through said resistors.

14. The invention according to claim 13 wherein hold off gaps are provided in the lines between said lamps and said discharge tube.

15. Apparatus for supplying a discharge current to a gas filled arc-gap flash lamp only during predetermined times when the amplitude of said current exceeds a given magnitude, said apparatus comprising:
- (A) a power source for supplying an alternating output of varying magnitude;
- (B) switching means connected in circuit with said power source and with said flash lamp and operable on receipt of a control signal to transmit a discharge current to said flash lamp from said power source at predetermined times when the amplitude of said output exceeds said magnitude;
- (C) control means connected to said power source to supply a control signal to said switching means at said predetermined times; and
- (D) means connected to said flash lamp to extinguish the discharge through said flash lamp when the amplitude of said output falls below said magnitude.

16. Apparatus according to claim 15 in which said switching means comprises a three-electrode switching element, said discharge current passing between a first and a second of said electrodes at said predetermined times, said third electrode being connected to said control means to control the passage of said discharge current through said switching means.

17. Apparatus according to claim 16 in which said means for extinguishing the discharge through the flash lamp comprises a three-electrode switching element having a first and a second of the electrodes connected to opposite terminals of said lamp and having a third electrode connected to said control circuit for causing a current discharge through said first and second electrodes when the amplitude of said discharge signal falls below a predetermined level.

References Cited

UNITED STATES PATENTS

| | | | |
|---|---|---|---|
| 2,091,953 | 9/1937 | Becquemont. | |
| 2,269,338 | 1/1942 | Edgerton et al. | |
| 2,674,703 | 4/1954 | Williamson | 315—252 X |
| 2,965,807 | 12/1960 | Fruengel. | |
| 3,031,598 | 4/1962 | Bell. | |
| 3,249,807 | 5/1966 | Nuckolls | 315—199 |

JOHN W. HUCKERT, *Primary Examiner.*

R. F. POLISSACK, *Assistant Examiner.*

U.S. Cl. X.R.

315—137, 146, 179, 191, 194, 199, 200, 205, 208, 246, 252, 272